United States Patent
Deter et al.

(10) Patent No.: US 6,428,169 B1
(45) Date of Patent: Aug. 6, 2002

(54) IMAGE REPRESENTATION SYSTEM

(76) Inventors: Christhard Deter, Brehmstrasse 27, D-07548 Gera; Joerg Wunderlich, Am Zuckerberg 26, D-07554 Gera, both of (DE)

(*) Notice: Subject to any disclaimer, the term of this patent is extended or adjusted under 35 U.S.C. 154(b) by 0 days.

(21) Appl. No.: 09/647,579
(22) PCT Filed: Feb. 2, 2000
(86) PCT No.: PCT/EP00/00830
§ 371 (c)(1),
(2), (4) Date: Oct. 2, 2000
(87) PCT Pub. No.: WO00/47001
PCT Pub. Date: Aug. 10, 2000

(30) Foreign Application Priority Data

Feb. 3, 1999 (DE) .......................... 199 04 372

(51) Int. Cl.[7] ........................... G03B 21/14; G03B 21/56
(52) U.S. Cl. ............................ 353/20; 353/79; 353/84; 359/443; 359/449
(58) Field of Search ............................. 353/20, 79, 84; 359/443, 449, 460

(56) References Cited

U.S. PATENT DOCUMENTS

| | | | | |
|---|---|---|---|---|
| 2,590,906 A | | 4/1952 | Tripp ........................... 359/584 |
| 4,354,739 A | * | 10/1982 | Scanion et al. ............. 359/359 |
| 5,193,015 A | * | 3/1993 | Shanks ........................ 349/115 |
| 5,337,179 A | * | 8/1994 | Hodges ....................... 359/443 |
| 5,485,225 A | | 1/1996 | Deter et al. ................. 348/804 |
| 5,486,884 A | * | 1/1996 | De Vaan ...................... 353/122 |
| 5,568,316 A | | 10/1996 | Schrenk et al. ............. 359/584 |
| 5,715,083 A | | 2/1998 | Takayama .................... 359/443 |
| 5,828,424 A | | 10/1998 | Wallenstein ................. 348/760 |
| 6,011,643 A | | 1/2000 | Wunderlich et al. ........ 359/279 |

FOREIGN PATENT DOCUMENTS

| | | |
|---|---|---|
| DE | 197 00 162 | 7/1998 |
| EP | 0 589 179 A1 | 3/1994 |
| EP | 0 788 015 A2 | 8/1997 |
| WO | WO 91/12556 | 8/1991 |
| WO | WO 95/03675 | 2/1995 |
| WO | WO 96/08116 | 3/1996 |
| WO | WO 98/20385 | 5/1998 |
| WO | WO 98/36320 | 8/1998 |

OTHER PUBLICATIONS

Bergmann Schäfer: "Lehrbuch der Experimentalphysik", Band, 3, 9. Auflage, OPTIK Verlag de Gruyter, Berlin, New York, 1993, Seiten 677, 678 with English Translation.

* cited by examiner

Primary Examiner—Russell Adams
Assistant Examiner—Magda Cruz
(74) Attorney, Agent, or Firm—Reed Smith LLP (57) ABSTRACT

An image display system a projector for emitting projection light for generating an image on a light-backscattering projection surface.

The wavelengths of the projection light lie in one or more discrete wavelength regions in the visible spectrum and the projection surface is covered on the projector side by an optical filter which passes only light with wavelengths corresponding to those of the projection light.

21 Claims, 5 Drawing Sheets

IMAGE REPRESENTATION SYSTEM

BACKGROUND OF THE INVENTION a) Field of the Invention

The invention is directed to an image display system with a projector for emitting projection light for generating an image on a light-backscattering projection surface.

b) Description of the Related Art

Image display systems have been common for a long time and are used, for example, in slide projection applications in the home or for showing films in cinemas.

In the last thirty years, image display systems have been developed in which LCD projectors, DLP projectors or laser projectors are used for writing an image with a light bundle.

Known image display systems use light-backscattering projection surfaces to present images, wherein the diffuse reflectance of commercially available projection surfaces in the visible wavelength range is largely independent from wavelength. Such projection surfaces are provided with a frame and a stand or suspension and are also referred to as image screens or projection screens. Projection screens are standardized, for example, according to DIN 19045.

The projection surface diffusely reflects (backscatters) the light originating from the projector back to the observer who visually perceives an image.

When ambient light acts upon the projection surface, it is also scattered from the projection surface toward the observer. As a result, even lowintensity ambient light drastically worsens the contrast (light/dark ratio) and color saturation (colorfulness) of the projected image. The ambient light interfering with the image display is usually sunlight or artificially generated light corresponding at least in some proportion to sunlight. In extreme cases, the projected image is practically entirely obliterated, for example, when sunlight strikes the projection surface directly when projecting images.

In order to overcome this problem, images are preferably projected at night or in very dark rooms as is known, for instance, in cinemas or planetaria. Also, presentations in conference halls or schools require rooms offering at least the possibility of darkening. The darkening of rooms requires that the building be outfitted with special lighting equipment and light openings which must be closed when necessary so as not to admit any light. However, the disadvantage in darkened rooms is that many activities can no longer be performed without sufficient illumination, e.g., writing. For this reason, it has always been necessary heretofore, e.g., in the case of presentations, to find a compromise between the necessary ambient light and the quality of the image display.

Recently, the light output of projectors has been considerably augmented, particularly by means of more efficient light sources. This has entailed a considerable expenditure in material and energy, although only a very limited improvement in contrast and color saturation has been achieved. Up to the present, daylight projection is possible only to a very limited extent even with very lightintensive projectors, but is increasingly in demand for purposes of advertisement and presentation without any satisfactory solution being available so far.

In order to reduce the influence of ambient light on the quality of the projected image, WO 98/36320 describes a projection screen comprising a plurality of layers. The uppermost layer or sequence of layers, considered in the projecting direction, reflects only the projection light. All other light components are absorbed by a lower layer. A projection surface of this type has a substantially dark effect in ambient light and is therefore known as a "black wall". A visibly improvement in contrast would be expected with a projection screen of this type when using laser light for projection. However, this improvement is not yet so significant that the demand for projection in a conventionally illuminated environment has been met.

U.S. Pat. No. 2,590,906 or U.S. Pat. No. 5,568,316 describe interference filters which, as narrow-band reflection filters, are adapted exactly to the wavelengths of the laser light source, e.g., they can be used in connection with a projection screen known from WO 98/36320.

On this basis, it is the object of the invention to provide an image display system with a projection screen with which an image can be displayed whose contrast and color saturation is substantially retained even in comparatively intense ambient light. For this purpose, the projection screen should also be suitable for large-image display and should enable large projection angles and large observation angles. The invention has the aim of achieving a substantial improvement in the colorfulness (color saturation) of colors and in the contrast of a projected image perceived by the observer even when illuminated by artificial light and/or sunlight.

According to the invention, this is achieved by an image display system with a projector for emitting projection light for generating an image on a light-backscattering projection surface, wherein the wavelengths of the projection light lie in one or more discrete wavelength regions in the visible spectrum and the projection surface is covered on the projector side by an optical filter which passes only light with wavelengths corresponding to those of the projection light.

It is completely surprising for the person skilled in the art that the projection characteristics of contrast and color saturation of a projected image can be maintained virtually unaffected by the influence of the ambient light by covering the light-backscattering projection surface on the projector side with an optical filter layer of this kind.

In contrast, the basis of the known solution according to WO 98/36329 is that, initially, the projection light is essentially reflected in an upper layer, while the ambient light is transmitted through this upper layer into a lower layer and is absorbed in the latter.

However, in the invention the ambient light is prevented from passing through the top layer. Only the projection light reaches the light-backscattering projection surface. This surface lies below (considered in the direction of incident light) the blocking layer formed by the optical filter. Accordingly, practically no light ambient light, or only very little ambient light, reaches the surface on which the image display is realized.

It must be taken into account that the formation of a projected image is attributed not only to an interaction of the projection light with the surface of the projection surface, but that the projection light also, as a rule, can penetrate into the surface layer of the projection surface, where it is subjected to a volume scattering. The light that is backscattered as a result of the volume scattering reemerges at the surface of the projection surface as backscattered light.

The invention follows a completely novel path in that the ambient light is maintained at the same distance, as far as possible, from the projection surface which backscatters the light toward the observer.

A further advantage of the image display system according to the invention is that ambient light components which should penetrate the optical filter due to the fact that its blocking effect is only finite, impinges again on the optical filter after being backscattered at the projection surface, so that its filtering effect for the ambient light is multiplied. Therefore, in the invention, the contrast and color saturation of the image projection is degraded only to an insignificant degree by the ambient light.

A significant advantage of the invention is that the existing, standardized and commercially available projection screens can also be used as a basic component in the projection surface according to the invention.

In contrast to the "black wall" known from the prior art, the invention can select from a large number of existing "white screens" with their specific characteristics.

In the invention, the spectrum of the projection light can be determined according to the image to be displayed. For example, the image may be a monochromatic image or a polychromatic image. The components of the image display system according to the invention are then configured corresponding to the selected wavelength range or the selected wavelength ranges.

In a preferred construction of the invention, the wavelengths of the projection light are in a wavelength range with a spectral bandwidth of less than 260 nm, in particular less than 80 nm. A spectral bandwidth of less than 260 nm, particularly with monochromatic image display, forms a limit, while a spectral .bandwidth of less than 80 nm is advisable particularly for displaying a polychromatic image.

In practice, however, the wavelength regions are no longer restricted, which results in a substantial improvement in image quality in relation to the influence of ambient light.

It is particularly preferred for monochromatic applications that the spectral bandwidth of the projection light is adjusted to the color to be projected and is at most about 120 nm. For displaying a red image, for example, as a warning, a light source with a radiation output maximum in the range of 620 nm to 630 nm is preferably selected.

Special advantages are realized through the use of a light source or light sources in the projector for generating projection light which particularly preferably emit(s) projection light with wavelengths in the ranges of 610 nm to 630 nm (red), 510 nm to 550 nm (green), and 400 nm to 470 nm (blue).

It is preferably provided that the transmission of the optical filter also achieves three maxima within these three wavelength ranges and is kept as small as possible outside of these wavelength ranges.

Because of its underlying physical principle, a laser light source generates a collinear light bundle with a small spectral bandwidth in the range of several tenths of a nanometer to several nanometers. However, relatively broadband laser radiation sources are advantageous in projection arrangements for speckle suppression, wherein a bandwidth of the laser radiation source between about 2 nm and 10 nm is particularly advantageous in connection with the invention. In this regard, it is also advantageous when the projection surface has good volume scattering characteristics in addition to the characteristic of diffuse reflectance.

The invention can also be used in particular for projecting color video images. The latter are generated from the three primary colors, red, green and blue. In this case, it is particularly favorable when the spectral half width is less than 10 nm for each of the primary colors. For color image display, an individual laser light source can be used which can generate the projection light in the three primary colors, red, green and blue, in a beam path (see, e.g., EP 0 788 015 A2) or which generates the projection light in separate beam paths (see, e.g., WO 91/12556 A1). Further, one laser light source can be used for generating projection light in each wavelength range which can be associated with one of the primary colors red, green and blue, respectively (as in WO 95/03675, for example).

However, the principle realized by the invention is not limited to the use of a laser light source for generating projection light. On the contrary, the projector can easily be constructed with a light source in the form of a temperature radiator, a gas discharge lamp or a semiconductor emitter, insofar as these light sources either emit only correspondingly narrow-band wavelength ranges or such narrow-band wavelength ranges are generated by correspondingly dimensioned filter elements.

A particularly advantageous construction of the invention consists in that the optical filter absorbs the incident light outside of its transmission range. This is advantageous in that the ambient light components are converted into heat energy and can no longer occur as light components in the eye of the observer.

However, it can also be advantageous when the optical filter in the invention has the characteristic that it reflects the incident light outside of its transmission range. In particular, an interference filter possesses this characteristic and also has the further advantage that it can be adapted very precisely to the wavelengths of the projection light and can be constructed with a very narrow band.

The reflection of the ambient light is carried out from the direction of the projection surface toward the observer and it would be expected that the reflected ambient light would lead to a deterioration in contrast and color saturation. Surprisingly, however, an entirely different result was shown. In spite of the fact that the ambient light is reflected back virtually in its entirety at the optical filter, the projected image appears with extremely full contrast and variegated colors without significant interference of the reflected ambient light.

The optical surface arranged in front of the entire surface of the projection surface can be produced by many different techniques and arranged in front of the projection surface.

It is particularly favorable when the optical filter is applied directly to the projection surface as a layer or layer system. The following production processes can be selected, for example: vacuum deposition, sputtering, chemical deposition, lamination, sol-gel process or painting. In particular, these processes enable largearea coating of projection surfaces having dimensions of several meters.

Another advantageous construction of the invention also consists in that the optical filter is arranged as a layer or layer system on a substrate which is transparent to the projection wavelengths. Therefore, the production of the optical filter can be carried out completely independent from the production of the projection surface. Only one assembly work step is required, wherein the substrate with the optical filter is joined with the projection surface. In the simplest case, the substrate with the optical filter is simply placed in front of the projection surface; however, this can result in additional reflections at the interfaces with the surrounding air. Therefore, it is particularly advantageous when the substrate is brought into direct contact with the surface of the projection surface which can be carried out, for example, simply by pressing on by means of compressed air or by adhesion forces. Examples of known production methods for this purpose are gluing or lamination. Technological requirements or determined filter materials may make it desirable to arrange a plurality of substrates one behind the other, wherein a layer or layer system is applied to each of these.

Accordingly, a desired spectral transmission of the optical filter can be realized by means of the principle of superposition of a plurality of filter layers.

A glass, a polymer material or a sheet is preferably used as substrate material. The substrate should have dimensions corresponding to the size of the projection surface in order to prevent seams due to parts placed against one another.

As was described above, interference filters are particularly well suited as optical filters. In this case, the optical filter is preferably formed of a system of nonabsorbent dielectric, or absorbent and nonabsorbent thin layers whose thickness is in the order of magnitude of the wavelength of visible light. Large-area production of such layers is relatively expensive. However, the extremely high degree of improvement in contrast and color saturation justifies this additional expenditure in many cases.

Less expensive but equally advantageous is the construction of the optical filter as a compound filter, especially in the form of a gelatin filter or colored glass filter.

While current known compound filters do not achieve the extreme selectivity of interference filters, they are likewise favorably suited for achieving a considerable improvement in contrast and in color saturation in image projection.

A particularly economical construction of the invention which utilizes the advantages of interference filters as well as compound filters consists in that the optical filter is a combination of a compound filter and interference filter, wherein, in particular, the substrate carrying the thin layers is designed as a compound filter. The transparent wavelength range of the optical filter need not necessarily correspond exactly to the wavelength ranges of the projection light; it can also be smaller. But this leads to intensity losses in projection light and accordingly to a darker image.

In certain cases, it is advantageous when the transparent wavelength range or wavelength ranges of the optical filter is or are selected so as to be up to 50 nm greater than the wavelength range or wavelength ranges of the projection light.

The effect whereby the transmission of an interference filter shifts to shorter wavelengths as the incident angles of the projection light increase is known (see Bergmann Schätfer "Lehrbuch der Experimentalphysik [Textbook of Experimental Physics]", volume 3, 9th edition, OPTIK Verlag Walter de Gruyter, Berlin, N.Y., 1993, 678). Therefore, it is advantageous particularly when narrow-band interference filters are used when the wavelength range or wavelength ranges of the optical filter is or are increased by up to 25 nm in the direction of shorter wavelengths relative to the wavelength range or wavelength ranges of the projection light. This ensures that all light components in the projection light are comprised by the bandwidth of the optical filter. Further, with respect to the dimensioning of the transmission ranges of an interference filter and the spectrum of the projection light, the transmission of the interference filter can also depend on the polarization direction of the projection light. This is an added advantage particularly when a laser light source is used and can be taken into account in the design of the image display system.

The invention also relates directly to a projection screen for use with an image display system according to the invention having a light-backscattering projection surface according to the invention which is coated with an optical filter that passes light in one or more discrete wavelength ranges in the visible spectrum and blocks the other wavelength ranges of visible light in front of the backscattering projection surface.

The invention will be described in principle in more detail in the following by way of example with reference to the drawings.

DESCRIPTION OF THE PREFERRED EMBODIMENTS

Figure 1:
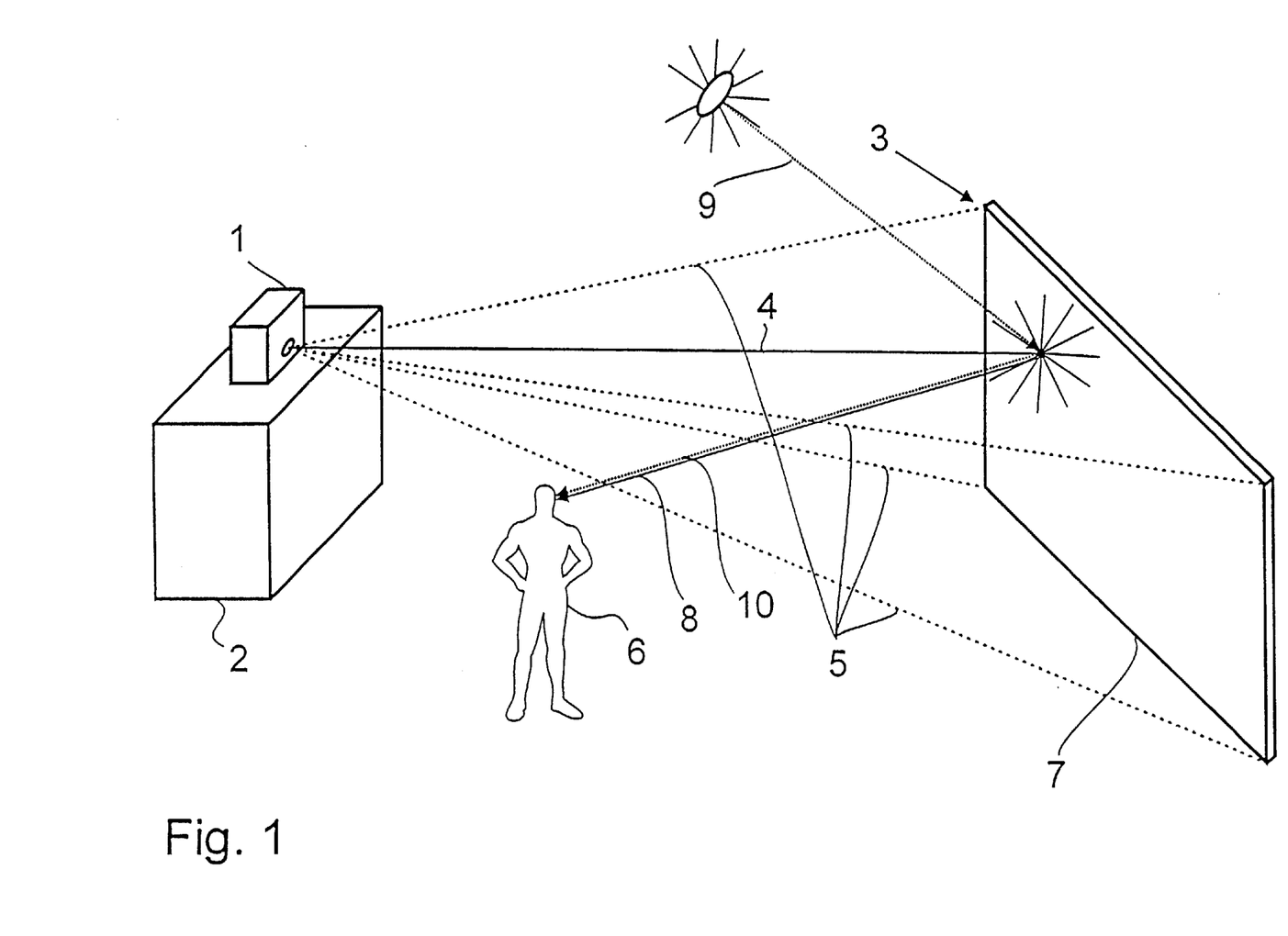
FIG. 1 shows an image display system with a conventional projection screen in a perspective schematic view.

FIG. 1 shows an image display system, for direct front projection. It comprises a projector 1 with a laser light source 2 and a projection screen 3 set up in a projection direction. The projector 1 emits projection light 4, represented schematically in FIG. 1 only by way of example by a thick projection beam 4, which impinges on the projection screen 3 within a surface determined by four projection beams 5 shown in dashed lines. An observer 6 is located outside of the pyramid-shaped light area formed by the projection beams 5 in order to prevent shadows on the projection screen 3.

The image display system shown here corresponds to the situation in a cinema.

In the example shown in FIG. 1, the laser light source 2 delivers three light wavelengths, namely, 446 nm for the color blue, 532 nm for green, and 628 nm for red. The laser light source 2 is an R-G-B laser system such as is described, for example, in WO 96/08116. The spectral bandwidths of the three light wavelengths are defined by their half widths which, in this case, lie between 0.5 nm and 2 nm.

The three color light bundles generated by the laser light source 2 are intensity-modulated (by a device not shown in FIG. 1) corresponding to a video signal and subsequently combined spatially to form an R-G-B light bundle. This R-G-B light bundle is then deflected in two dimensions in the projector 1 and strikes the projection screen 3 as projection light 4. A projector of this kind is described in more detail, for example, in WO 95/03675 A1.

The projection light 4 strikes the projection screen 3 which has a backscattering projection surface 7 on its surface on the projection side, i.e., on the surface facing the projector 1. In this case, the incident projection light 4 enters into a multiple interaction with the structure of the backscattering projection surface 7 and the material of the projection screen 3. Backscattered projection light 8 occurs. WO 98/20385, for example, describes how a projection screen 3 used in connection with laser light as projection light 4 should be constructed.

The projection light 8 which is backscattered by the projection surface 7 impinges (in part) on the eyes of the observer 6.

Further, ambient light 9 is shown schematically in FIG. 1. Light components of the ambient light 9 with different color temperatures reaches the projection surface 7 completely without hindrance. These light components are backscattered at the latter, as is the projection light 4, and, accordingly, backscattered ambient light 10 as well as backscattered projection light 8 also reach the retina of the eyes of the observer 6.

However, as a result of this superposition of light, the light/dark ratios and the colorfulness (saturation) of the colors perceived by the observer 6 are reduced considerably, so that the observer 6 can perceive (if anything) only a faint, low-contrast image.

Figure 2:
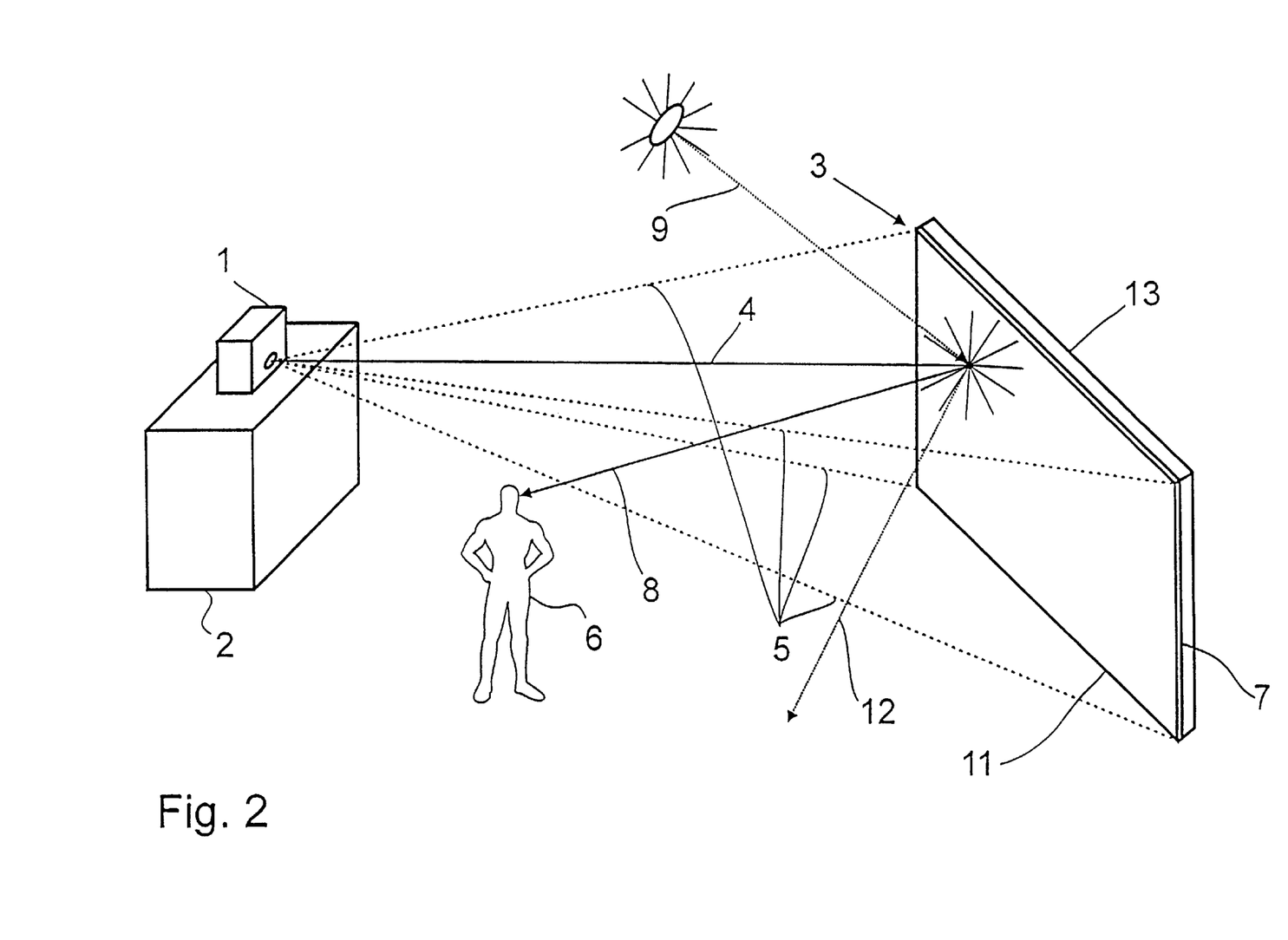
FIG. 2 shows an image display system according to the invention in a perspective schematic view.

FIG. 2 shows, in principle, the same image display system for front projection as in FIG. 1 with the projector 1 which projects projection light 4, which contains the red, green and blue (R-G-B) laser light components, onto the projection screen 3. The projection surface 7 backscatters the projection light 4, and backscattered projection light 8 reaches the eyes of the observer 6.

However, the projection screen 3 used in this case has a different construction than the projection screen in FIG. 1 in that an optical filter 11 is applied over the entire surface of the backscattering projection surface 7 of a projection screen material 13.

This optical filter 11 is constructed in such a way that it passes wavelengths of the utilized laser light in their respective corresponding bandwidth, while all other wavelength ranges of visible light (ambient light) are prevented from passing through.

Accordingly, in this case, the optical filter 11 has a (highest possible) transmission only for the laser wavelengths. This means that the projection light 4 can pass virtually unimpeded through the filter 11 to the projection surface 7 from which it is then backscattered, then once again passes through the optical filter 11 (again without hindrance) and finally reaches the eye of the observer 6.

Therefore, the projection screen 3 with the optical filter 11 arranged in front initially has the same characteristics for the projection light 4 from the laser light source 2 as a commercially available projection screen (e.g., the projection screen 3 in FIG. 1).

Also, ambient light 9 is shown purely schematically in FIG. 2 by a beam illustrated by dotted lines. The beam impinges without hindrance on the projection screen 3 where, however, in contrast to FIG. 1, only the component of the beam whose wavelengths lie within the wavelength ranges passed by the filter 11 reaches the projection surface 7.

This (small) proportion of ambient light which contains the wavelengths passed by the optical filter 11 can also contain small proportions of light in the rest of the wavelength range which originate exclusively in that the optical filter 11, in practice, does not in block entirely 100% in the range in which it should not transmit.

However, it is essential that the overwhelming proportion of ambient light 9 does not even reach the backscattering projection surface 7 and accordingly cannot be backscattered by the latter, so that there can also be no disturbing superposition of backscattered projection light 8 and backscattered ambient light 10.

The proportion of ambient light which does pass through the optical filter 11 and whose wavelengths lie outside the range of wavelengths of the projection light 4 must then pass through the optical filter 11 a second time. Accordingly, with a blocking effect of the optical filter of 90%, for example, 10% of the ambient light 10 still reaches the backscattering projection surface 7. At most this proportion of 10% will be backscattered again at the 90% blocking layer of the optical filter 11 from which there emerges only less than 1% of the backscattered ambient light 10 which can reach the observer 6 in the same way as the backscattered projection light 8.

The ambient light components blocked by the optical filter 11 pass traverse a completely different optical path.

In the example shown in FIG. 2, the optical filter 11 is constructed as an interference filter 16. This optical filter 11 is designed in such a way that the blocked light components are reflected in a predominantly uniform manner. The ambient light 12 which is diffusely reflected at the optical filter 11 has completely different radiating characteristics and a completely different directional characteristic than the backscattered projection light. Therefore, as a rule, only a very small part of the reflected ambient light 12, if any, reaches the eye of the observer 6. This effect has the result that image projection in ambient light on the projection screen 3 according to the invention, which is coated over the entire surface with the optical filter 11 adapted to the wavelengths of the projection light 4, shows a one hundred-fold improvement in the light/dark ratio, wherein the colorfulness (saturation) is retained to the same extent as when perceived in a darkened room.

In the example, the projector 1 is a laser projector which, as is described in FIG. 1, operates with a writing light bundle. However, the projector can also be a DLP projector which is outfitted with a laser light source 2 whose light bundle is expanded to the size of the DMD array. A projector of this kind is described, for example, in EP 0 589 179 A1. Slide projectors or LCD projectors can also be used when operated with sufficiently narrow-band light sources.

Figure 3:
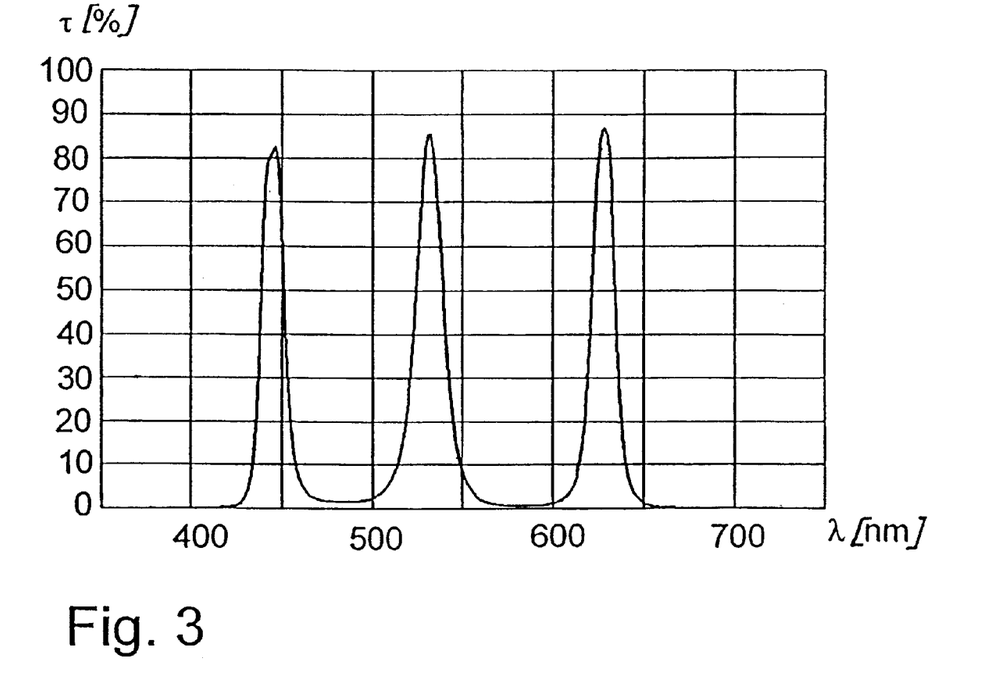
FIG. 3 shows the transmission spectrum of an interference filter for an image display system, according to the invention, for projecting color images.

FIG. 3 shows the transmittance characteristic of an optical filter 11 which is produced as an interference filter and at which the maximum transmission is set at the wavelengths of the projection light of 445 nm, 532 nm and 628 nm. In this connection, (as also in FIGS. 4 and 9) T represents the transmittance in percent (radiant transmittance) and $\lambda$ represents the wavelength (in nm). Each of the three ranges in which the optical filter 11 passes light has a half width of approximately 20 nm. The bandwidth of the transmitted wavelength ranges in this example is about ten times greater than the bandwidth of the laser light wavelengths. Therefore, the filter characteristic shows no dependency on the angle of incidence of the projection light 4 and differences in lightness which are hardly perceptible by the observer when the observer occupies different locations with respect to the projection screen.

The person skilled in the art is sufficiently familiar with the calculation and production of interference filters of this kind which are also extensively described in the literature. The aim of dimensioning is the best possible transmission in the wavelength or wavelengths of the projection light, wherein the greatest possible independence from customary projection angles and observer angles is to be achieved. A 100% transmission of the optical filter in the wavelengths of the projection light ensures optimum utilization of the projection light for displaying images.

However, the degree of the blocking effect of the optical filter 11 is not critical. Because of the above-mentioned effect whereby the ambient light passes through the optical filter 11 twice (insofar as it passes through the filter 11 at all), even a blocking effect of the filter 11 of only 90% results in completely satisfactory functioning in the wavelength range to be blocked.

Figure 4:
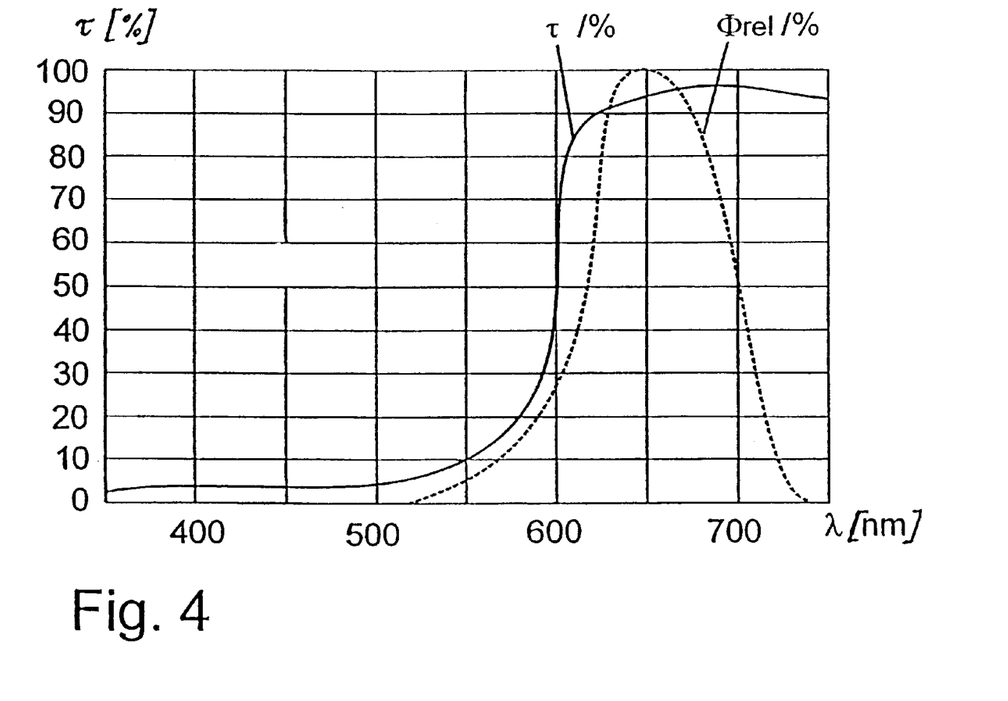
FIG. 4 shows the transmission spectrum of a gelatin filter and a red luminescent diode for an image display system, for monochromatic image projection.
Figure 5:
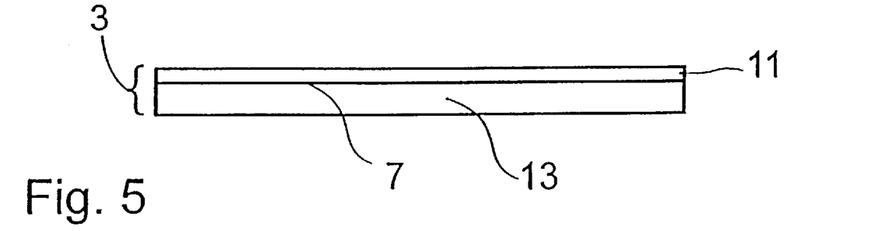
FIG. 5 shows a projection screen, according to the invention, in which the optical filter is applied directly.

FIG. 4 shows a graph illustrating the transmission of a commercially available gelatin filter offered by KODAK. The gelatin filter is a compound filter 17 whose construction is shown in FIG. 5. The graph also shows the emission spectrum of a luminescent diode (where φrel designates the relative light flux of the luminescent diode) having a half width of about 50 nm which is transmitted virtually unhindered by the selected gelatin filter. The other wavelengths of the light are absorbed. In this case also, a considerable improvement in contrast is achieved under the influence of ambient light and the colorfulness of red, in this case, is also retained.

FIG. 5 shows, in principle, the construction of a projection screen 3 in which the optical filter 11 is directly connected with the backscattering projection surface 7. The projection screen 3 comprises a projection screen material 13, e.g., a product known commercially as "Durabla Blankana" available from Mechanische Weberei Lippspringe. The surface of the projection screen material 13 has light-backscattering characteristics and forms the backscattering projection surface 7.

The optical filter 11 is a compound filter 17 and is formed of a layer 14 which is commercially available as a gelatin filter in the form of a colored sheet. The sheet is pressed onto the solid projection screen material 13 accompanied by pressure and heat.

A projection screen of this type is sufficient for many applications, for example, those indicated with reference to FIG. 4.

It is sometimes also advantageous when a plurality of compound filters are arranged one on top of the other, wherein their transmission characteristics are superposed to form the desired transmission behavior.

Figure 6:
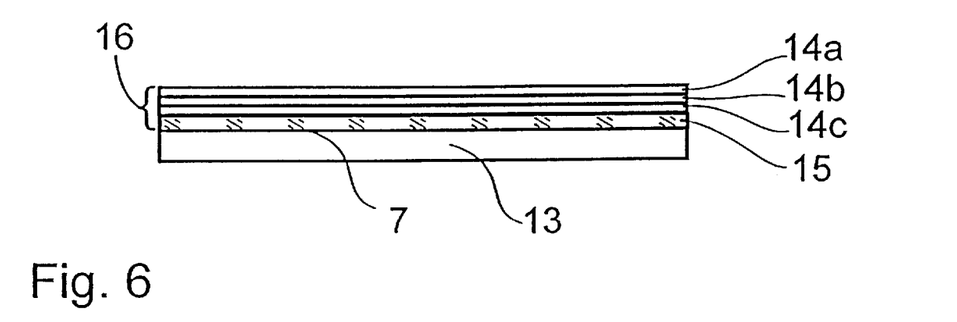
FIG. 6 shows a projection screen, according to the invention, with a substrate carrying the optical filter.

FIG. 6 shows a projection screen 3 with a substrate 15 carrying the optical filter 11. The substrate 15 carries an interference filter 16 which is formed of a plurality of layers 14a, 14b, 14c. Although only three layers are shown, an interference filter of this type with characteristics such as those indicated with reference to FIG. 3 can comprise up to 40 layers.

The substrate 15 is formed of a glass which is particularly well suited for producing interference layers under high vacuum.

Currently, it is possible to produce the layer system of interference layers so as to be mechanically and chemically resistant. Therefore, the filter layers 14a, 14b and 14c of the filter 16 in FIG. 6 are located on the side of the substrate 15 remote of the projection screen material 13. A surface of the substrate 15 that is not coated is connected with the backscattering projection surface 7 of the projection screen material 13 by cement.

However, it is also possible to apply a layer or all layers to the side of the substrate 15 facing the projection surface 7. In this case, the interference layers are protected against environmental influences by the substrate 15.

Figure 7:
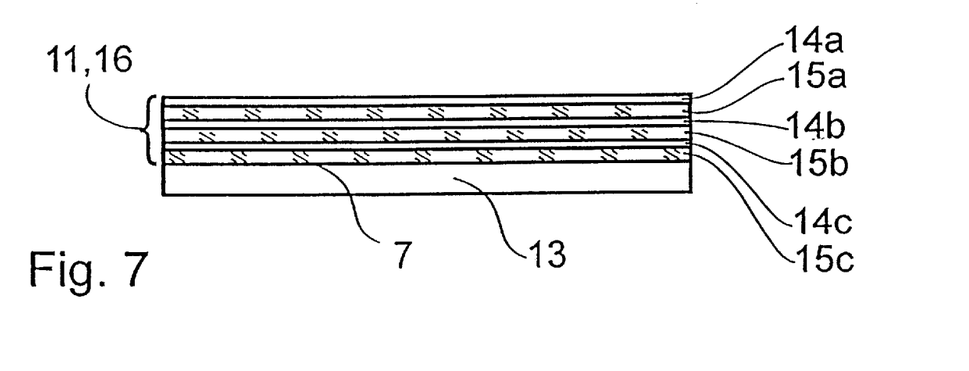
FIG. 7 shows a projection screen, according to the invention, with layered substrates.

FIG. 7 shows a projection screen 3 with substrate layers 15a, 15b and 15c, each of which is provided with one or more filter layers 14a, 14b and 14c.

The production of an interference filter 16 is much simpler and more economical when it only needs to be designed for one wavelength range and the desired filter function is achieved by superposition of individual filter characteristics.

In the example in FIG. 7, the substrate 15a has a layer 14a forming an optical filter which blocks light up to 435 nm and starting from 635 nm. The substrate 15b has a layer 14b which is transparent in the wavelength range up to 470 nm, then blocks up to 525 nm and is transparent again for greater wavelengths. The substrate 15c carries a layer 14c which blocks the wavelength range between 540 nm and 625 nm.

All layers can be constructed as interference filters or as compound filters.

Figure 8:
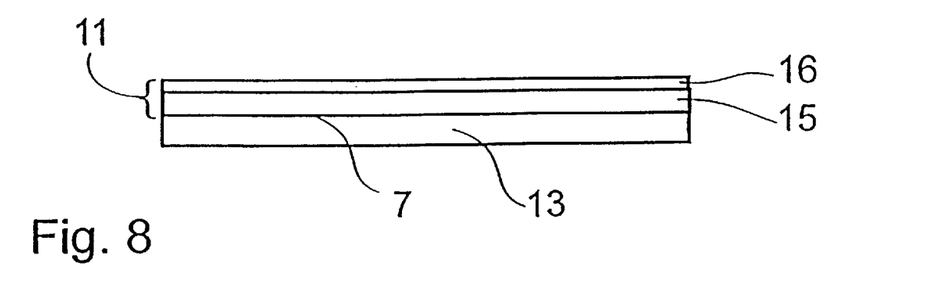
FIG. 8 shows a projection screen, according to the invention, with a combination of compound filter and interference filter.

FIG. 8 shows a projection screen 3 with an optical filter 11 which is formed of a combination of compound filter 17 and interference filter 16. In this case, the compound filter 17 also simultaneously forms the substrate 15 for the interference filter 16.

In this example, the compound filter 17 passes a wavelength range below 630 nm. The interference filter 16 blocks below 440 nm, in a range from 470 nm to 520 nm and again in a second range from 540 nm to 515 nm.

In principle, the projection screen construction shown in FIG. 8 can also be further modified in the manner of the construction in FIG. 7.

The variants shown herein result in many possibilities for generating a suitable or desired filter characteristic which has a sufficiently narrow band on the one hand and which requires the smallest possible expenditure on production on the other hand.

Figure 9:
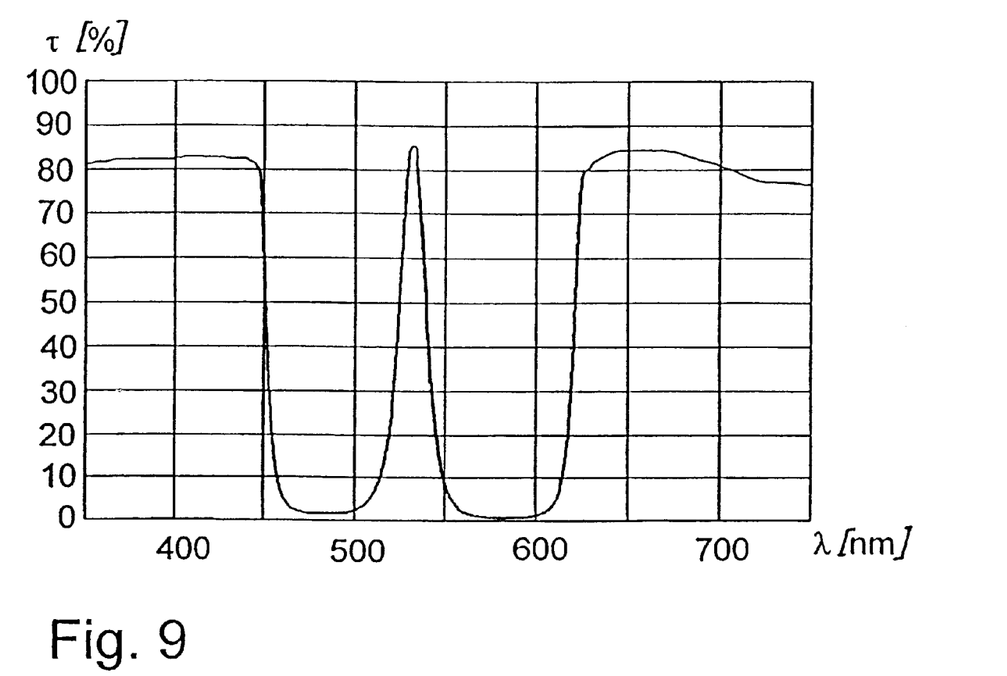
FIG. 9 shows the transmission spectrum of an optical filter with a simplified characteristic for use in an image display system according to the invention.

FIG. 9 shows a transmission spectrum of a compound filter with a simplified filter characteristic. In this case, as also in FIGS. 3 and 4, T represents the transmittance in percent (radiant transmittance) and λ represents the wavelength (in nm). The fact that the spectral sensitivity of the human eye decreases radically with short wavelengths of visible light as well as with long wavelengths of visible light is taken into account in the dimensioning of the optical filter. Therefore, in connection with the selection of wavelengths of the projection light, the optical filter passes light from the wavelengths-of blue projection light to the ultraviolet spectral region and from the wavelengths of the red projection light to the infrared spectral region. A further transmission range is furnished only for the wavelengths of the green projection light (in the range of about 525 nm). FIG. 9 shows a transmission curve of this type. With this optical filter, a considerable proportion of the ambient light can also be blocked before the backscattering projection surface. In this example, the optical filter is produced as a two-band reflection filter by interference filter techniques.

While the foregoing description and drawings represent the present invention, it will be obvious to those skilled in the art that various changes may be made therein without departing from the true spirit and scope of the present invention.

What is claimed is:
1. An image display system comprising:
a light-backscattering projection surface;
a projector for emitting projection light for generating an image on said light-backscattering projection surface, wavelengths of the projection light lying in one or more discrete wavelength regions in the visible spectrum; and an optical blocking filter covering the projection surface on the projector side and having a transparent wavelength range or transparent wavelength ranges in the visible spectrum, which correspond to said wavelength region of the projection light which are at the most, up to 50 nm wider than the wavelength region of the projection light, so that essentially only light with wavelengths corresponding to those of the projection light passes said optical filter and reaches said projection surface, while light of all other wavelength ranges in the visible spectrum is prevented from passing through, wherein said light reaching said projection surface is backscattered at the projection surface and passes said optical filter again.

2. The image display system according to claim 1, wherein the wavelengths of the projection light are in a wavelength range with a spectral bandwidth of less than 260 nm.

3. The image display system according to claim 2, wherein the spectral bandwidth is less than 80 nm.

4. The image display system according to claim 1, wherein the projector includes a laser light source for generating the projection light.

5. The image display system according to claim 4, wherein the laser light source emits projection light with wavelengths in the ranges of 610 nm to 630 nm (red), 510 nm to 550 nm (green), and 400 nm to 470 nm (blue).

6. The image display system according to claim 1, wherein the projector is constructed with a light source in the form of a temperature radiator.

7. The image display system according to claim 1, wherein the projector is constructed with a light source in the form of a gas discharge lamp.

8. The image display system according to claim 1, wherein the projector is constructed with a light source in the form of a semiconductor emitter.

9. The image display system according to claim 1, wherein the optical filter absorbs the incident light outside of its transmission range.

10. The image display system according to claim 1, wherein the optical filter reflects the incident light outside of its transmission range.

11. The image display system according to claim 1, wherein the optical filter is applied directly to the projection surface as a layer or layer system.

12. The image display system according to claim 11, wherein the layer system is formed of nonabsorbent dielectric, or absorbent and nonabsorbent thin layers whose thickness is in the order of magnitude of the wavelength of visible light and forms an interference filter.

13. The image display system according to claim 1, wherein the optical filter is arranged as a layer or layer system on a substrate which is transparent to the projection wavelengths.

14. The image display system according to claim 13, in which a plurality of substrates are arranged one behind the other, wherein a layer or a layer system is applied to each of these.

15. The image display system according to claim 13, wherein the substrate is a glass.

16. The image display system according to claim 13, wherein the substrate is a polymer material.

17. The image display system according to claim 13, wherein the substrate is a sheet.

18. The image display system according to claim 13, wherein the optical filter is a combination of a compound filter and interference filter, wherein, in particular, the substrate carrying the thin layers is designed as a compound filter.

19. The image display system according to claim 1, wherein the optical filter is a compound filter.

20. The image display system according to claim 19, wherein the compound filter is gelatin filter or colored glass filter.

21. The image display system according to claim 1, wherein the transparent wavelength range or transparent wavelength ranges of the optical filter is or are up to 50 nm greater than the wavelength range or wavelength ranges of the projection light.

* * * * *